United States Patent
Blouin et al.

(10) Patent No.: US 7,054,700 B2
(45) Date of Patent: May 30, 2006

(54) METHOD AND SYSTEM FOR EFFICIENT ORDER PROCESSING IN A MANUFACTURING ENVIRONMENT

(75) Inventors: Eric E. Blouin, Ardmore, PA (US); Barry A. Kritt, Raleigh, NC (US); Douglas A. Law, Chapel Hill, NC (US); Kuldip Nanda, Apex, NC (US); Paul A. Roberts, Raleigh, NC (US)

(73) Assignee: Lenovo Pte. Ltd., Singapore (SG)

( * ) Notice: Subject to any disclaimer, the term of this patent is extended or adjusted under 35 U.S.C. 154(b) by 0 days.

(21) Appl. No.: 10/716,061

(22) Filed: Nov. 17, 2003

(65) Prior Publication Data

US 2005/0107902 A1 May 19, 2005

(51) Int. Cl.
*G06F 19/00* (2006.01)

(52) U.S. Cl. .................... 700/96; 700/121; 714/274

(58) Field of Classification Search ........... 700/216, 700/96, 108, 222, 109, 121, 98, 212; 714/274, 714/703, 742; 709/224
See application file for complete search history.

(56) References Cited

U.S. PATENT DOCUMENTS

| 4,868,875 | A | * | 9/1989 | Goatman ................... 379/429 |
| 5,136,705 | A | * | 8/1992 | Stubbs et al. ................ 714/27 |
| 5,901,289 | A | * | 5/1999 | Leonard et al. ............ 709/224 |
| 6,557,128 | B1 | * | 4/2003 | Turnquist ................... 714/724 |
| 6,721,762 | B1 | * | 4/2004 | Levine et al. .............. 700/216 |
| 2002/0162059 | A1 | * | 10/2002 | McNeely et al. .......... 714/703 |
| 2003/0208712 | A1 | * | 11/2003 | Louden et al. ............ 714/742 |

* cited by examiner

*Primary Examiner*—Kidest Bahta
(74) *Attorney, Agent, or Firm*—Sawyer Law Group LLP

(57) ABSTRACT

Aspects for efficient order processing in a manufacturing environment are described. The aspects include utilizing a hierarchical definition language with run-time control capability to represent and control a box line manufacturing process of computer systems in a unified manner. Further provided is a state file, the state file including blocks, sub-blocks, tasks, and containers for run-time information of the box line manufacturing process of computer systems. A sequencer tool interacts with the state file to direct tasks of the state file, monitor task completion, and update the state file with real-time control information. A listener tool interacts with the sequencer tool to start tasks, monitor tasks, and send task results to the sequencer tool.

20 Claims, 2 Drawing Sheets

METHOD AND SYSTEM FOR EFFICIENT ORDER PROCESSING IN A MANUFACTURING ENVIRONMENT

RELATED APPLICATIONS

The present invention is related co-pending to U.S. patent applications, entitled METHOD AND SYSTEM FOR EFFICIENTLY BINDING A CUSTOMER ORDER WITH A PROCESSING SYSTEM ASSEMBLY IN A MANUFACTURING ENVIRONMENT, Ser. No. 10/716,161, and METHOD AND SYSTEM FOR ALLOWING A SYSTEM UNDER TEST (SUT) TO BOOT A PLURALITY OF OPERATING SYSTEMS WITHOUT A NEED FOR LOCAL MEDIA, Ser. No. 10/715,961, filed on even date herewith, and assigned to the assignee of the present invention.

FIELD OF THE INVENTION

The present invention relates generally to processing systems and more particularly to a system and method for efficient order processing in a manufacturing environment.

BACKGROUND OF THE INVENTION

During a box line manufacturing process of computer systems, the first step an operator performs is to assemble a unit (hereafter called a system under test, or SUT) from a kit of parts. This is normally done in a unique physical area known as "Assembly". A manufacturing line layout may dictate that there are many separate areas for the manufacturing process, including an assembly area, an attended test area, an unattended test area, a hi-pot (high potential) testing area, and a debug area.

Lack of a single, unified architecture for representing the end-to-end manufacturing process limits the efficiency of the process. For example, there is no control mechanism to start concurrent tasks on an SUT or a group of SUTs, track those tasks, and ensure that all tasks are completed correctly and within an allotted time period. Thus, when SUT problems or hangs disable an SUT from reporting the problem and maintaining process control, the disabled machine could potentially sit for hours until an operator explicitly addressed it. Further, a control mechanism is lacking that can support a variety of operating systems and configurations being assembled, such as 32-bit Linux™, 64-bit Linux™, 32-bit Windows™, 64-bit Windows™, 32-bit EFI™, 64-bit EFI™, and DOS. These operating systems run on Itanium, BladeCenter™, BladeCenter JS20 (based on the IBM Power4™ chip), eServer pSeries, and Intel x86-based machines, as are available from IBM Corporation of Armonk, N.Y.

Accordingly, a need exists for a unified manufacturing process representation and control for more efficient order processing in a manufacturing environment. The present invention addresses such a need.

SUMMARY OF THE INVENTION

Aspects for efficient order processing in a manufacturing environment are described. The aspects include utilizing a hierarchical definition language with run-time control capability to represent and control a box line manufacturing process of computer systems in a unified manner. Further provided is a state file, the state file including blocks, sub-blocks, tasks, and containers for run-time information of the box line manufacturing process of computer systems. A sequencer tool interacts with the state file to direct tasks of the state file, monitor task completion, and update the state file with real-time control information. A listener tool interacts with the sequencer tool to start tasks, monitor tasks, and send task results to the sequencer tool.

Through the present invention, a hierarchical process definition language with run-time control capability is described for a single file that is a persistent structure that can be stopped and restarted at arbitrary points for representation and control of a unified manufacturing process. These and other advantages of the present invention will be more fully understood in conjunction with the following detailed description and accompanying drawings.

DETAILED DESCRIPTION

The present invention relates generally to processing systems and more particularly to a system and method for efficient order processing in a manufacturing environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
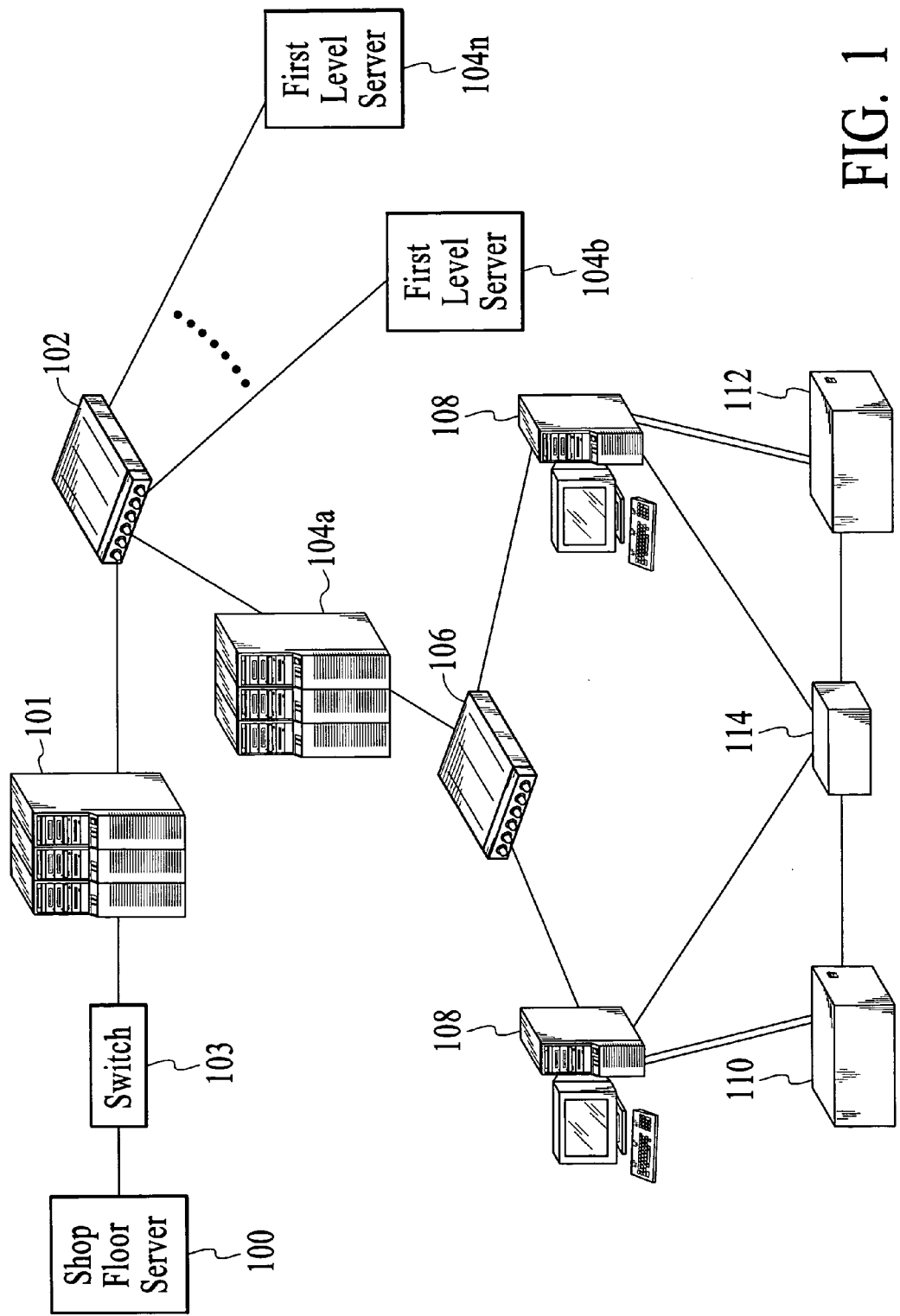
FIG. 1 illustrates a system diagram of a manufacturing environment for processing system assembly in accordance with a preferred embodiment of the present invention.

FIG. 1 illustrates a system diagram of a manufacturing environment for processing system assembly in accordance with a preferred embodiment of the present invention. Included is a shop floor system server 100 coupled via a network switch, e.g., an Ethernet switch 103, to a second level server 101. The second level server is coupled to a plurality of first level servers 104a–104n via switch 102. Another network/Ethernet switch 106 couples the first level server 104 to local control stations 108, such as an X3 station available from IBM Corporation, Armonk, N.Y. The local control stations 108 are each coupled to a system under test (SUT) 110, 112. A power cycler 114 is also coupled to the local control stations 108 and SUTs 110, 112.

It should be appreciated that although a single first level server is represented in FIG. 1, multiple first level servers may be utilized, each first level server networked to the shop floor system server and supporting a networked connection to other arrangements of local control stations and SUTs.

Figure 2:
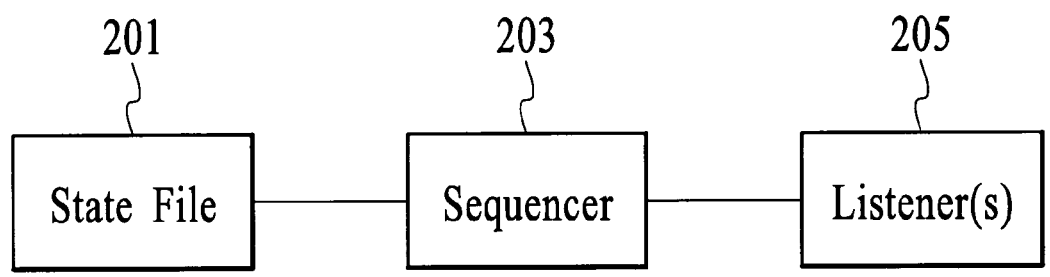
FIG. 2 illustrates a block diagram of elements included in a process representation and control for the system of FIG. 1 in accordance with a preferred embodiment of the present invention.

A unified manufacturing process representation and control for the manufacturing environment of FIG. 1 is provided in accordance with the present invention. FIG. 2 illustrates a block diagram of elements included in the process representation and control. Preferably, the present invention is implemented as software entities on a suitable computer readable medium of the systems as needed within the manufacturing environment. As shown, a state file 201 is provided in a hierarchical, block-structured process definition language with run-time control capability that defines a manufacturing process and provides an abstraction from the complexities of the underlying implementation. In a preferred embodiment, the state file 201 is provided using XML (extensible mark-up language). A sequencer 203 is also provided as a software entity that walks through the state file 201, scheduling task execution, handling results, and recording progress as specified by the process definition language within the state file 201. Progress is recorded by the sequencer 203 by updating the state file 201, using standard XML structure, with run-time information. The path taken through the state file 201 by the sequencer 203 is determined by the results returned from executed programs, as well as built-in attributes and flow control tasks in the state file 201.

Distributed execution of tasks on the SUTs 110, 112 and other systems on the network is accomplished by the direct transmission of the state file 201 tasks to listeners 205 running on remote machines or on the machine running the sequencer itself. Listeners 205 run on all applicable targets under all required operating systems. A listener executes all received tasks as separate tasks, each running in an environment (directory, environment variables, etc.) specified in the message from the sequencer. A message protocol for the sequencer and listener to communicate includes unique IDs (identifiers) for each task, the return code, as well as other data fields. The listener keeps track of all launched tasks in a list, indexed by the action ID that was sent in the task message. Multiple tasks may run in parallel, with the listener returning the results to the sequencer in an XML message when each task completes.

In the operation of the assembly environment of FIG. 1, the shop floor system server 100 passes customer orders to the second level server 101 and launches server-side code to perform an initial binding process in accordance with the present invention, as described in more detail in co-pending U.S. patent application entitled METHOD AND SYSTEM FOR EFFICIENTLY BINDING A CUSTOMER ORDER WITH A PROCESSING SYSTEM ASSEMBLY IN A MANUFACTURING ENVIRONMENT, Ser. No. 10/716, 161, and assigned to the assignee of the present invention. The first level server 104 contains MTSN (machine-type-serial-number) directories. A MTSN directory contains, among other data, the process state file 201 which is built based on the specifics of the customer's order. The local control stations 108 run code to perform in-process binding, as described in more detail in the aforementioned U.S. patent application (Ser. No. 10/716,161). In performing the in-process binding, code running on the local control stations 108 launches the sequencer 203 once the binding is complete for a given SUT.

A listener 205 can run on the first level server 104 to execute commands on the first level server 104. A listener 205 can also run on the local control station 108 to execute commands on an embedded controller, such as for power cycling or service processor communication. The SUTs 110, 112 run listeners 205 that execute commands locally on the SUTs 110, 112.

In a preferred embodiment, elements within XML are used to define blocks, sub-blocks, tasks, and containers for run-time information in the state file 201. Capabilities may be assigned at the block level or on the individual commands. Blocks contain further sub-blocks and/or task elements. The contents of a block may be designated to run it's contents sequentially, concurrently on one SUT, or in parallel on multiple SUTs. In addition, blocks can contain retries and loops, both of which can be nested. The user is isolated from the underlying implementation by simply attaching attributes to blocks.

The following XML examples illustrate key capabilities achievable through the state file 201 of the present invention.

EXAMPLES

1) Simple, No Content Block Structure

In this example a root element is called "TOP" and one child process block under the root is called "TEST". This state file would run successfully, but would not do anything.

```
<BLOCK BNAME="TOP">
    <BLOCK BNAME="TEST">
    </BLOCK>
</BLOCK>
```

2) Adding Action Elements (SEND_CMD) to the TEST Block

In this example, two action elements have been added to the TEST block of Example 1.

The command string may be any command that can be invoked from the command line of the target machine.

```
<BLOCK BNAME="TOP">
    <BLOCK BNAME="TEST">
        <SEND_CMD> python mysetup.py </SEND_CMD>
        <SEND_CMD> mytest.exe </SEND_CMD>
    </BLOCK>
</BLOCK>
```

3) Specifying Listener Target Queue to Action Elements

The target queue control attribute defines which listener will receive the command for execution. In this example the first command is sent to a listener running on the local control station, while the second is run on the SUT.

```
<BLOCK BNAME="TOP">
    <BLOCK BNAME="TEST">
        <SEND_CMD Q="STN"> python mysetup.py </SEND_CMD>
        <SEND_CMD Q="SUT"> mytest.exe </SEND_CMD>
    </BLOCK>
</BLOCK>
```

4) Adding Watchdog Timers

Here a watchdog timer is added to both the mysetup.py program as well as to the TEST block which contains it. The mysetup.py program will fail if it takes longer than 20 minutes to complete, while the TEST block will fail if it runs for longer than 1 hour and 30 minutes.

```
<BLOCK BNAME="TOP">
    <BLOCK WD_FAIL_TIME="0:0:1:30" BNAME="TEST">
        <SEND_CMD WD_FAIL_TIME="0:0:0:20"> python
        mysetup.py </SEND_CMD>
        <SEND_CMD> mytest.exe </SEND_CMD>
    </BLOCK>
</BLOCK>
```

5) Adding an RC Constraint and RC-to-MERR Mapping to an Action

The next example shows how to limit the allowable PASS return codes that an action may return. This will be needed when a program does not follow a default rule of the local control station that RC=0 (Return Code=0) indicates PASS, while RC!=0 indicates FAIL.

Also shown is how to map return codes to specific mfr (manufacturing) error (MERR) codes. In this example, return codes from the fictitious program, mysetup.py, are handled in the following manner:

```
if rc=0    -> MERR=0000FF00
if rc=1    -> MERR=0000E100
else       -> PASS (no MERR)
```

The changes required to accomplish this:

```
<BLOCK BNAME="TOP">
  <BLOCK BNAME="TEST">
    <SEND_CMD RC_TO_MERR="(0):0000FF00 (1):0000E100 (2:*):PASS" Q="STN">
       python mysetup.py
    </SEND_CMD>
  </BLOCK>
</BLOCK>
```

6) Specifying a Block Where Commands Will Run in Parallel

In this example the first command is sent to a listener running on the local control station, while the second is run on the SUT. Both will run simultaneously and the block will continue to execute until both are complete, or one has failed.

```
<BLOCK BNAME="TOP">
  <BLOCK EXEC_MODE="PARALLEL" BNAME="TEST">
    <SEND_CMD Q="STN"> python mysetup.py </SEND_CMD>
    <SEND_CMD Q="SUT"> mytest.exe </SEND_CMD>
  </BLOCK>
</BLOCK>
```

7) Adding Retry Logic to the TEST Block

Here a MAX_RETRIES attribute is added that will retry the TEST block up to 3 times if either of the two action lines experiences a failure. Prior to each retry, the commands in the ON_RETRY block are executed. In this example a screen message command is being executed on both the SUT and local control station in the ON_RETRY block. Also illustrated in the ON_RETRY block is the use of the PRE_INCREMENT="NO_WAIT" attribute that results in the sequencer executing the commands without waiting for them to complete before continuing

```
<BLOCK BNAME="TOP">
  <BLOCK BNAME="TEST" MAX_RETRIES="3">
    <SEND_CMD Q="STN"> python mysetup.py </SEND_CMD>
    <SEND_CMD Q="SUT"> mytest.exe </SEND_CMD>
    <ON_RETRY>
      <SEND_CMD Q="STN" PRE_INCREMENT="NO_WAIT">
       echo Block "TEST" is being retried</SEND_CMD>
```

-continued

```
      <SEND_CMD Q="SUT" PRE_INCREMENT="NO_WAIT">
       echo Block "TEST" is being retried </SEND_CMD>
    </ON_RETRY>
  </BLOCK>
</BLOCK>
```

8) Adding Looping Logic to the TEST Block

Here a MAX_LOOPS attribute is added that will re-run the TEST block up to 3 times if no errors are encountered during the execution of the commands in the test block.

An ON_LOOP block, if one exists within a LOOP block, will be executed if all of the actions in the LOOP block have been completed and there are no mfg errors.

Any actions in the ON_LOOP section will be executed, and then the parent LOOP block will be repeated. This will be repeated as many times as specified by the MAX_LOOPS control attribute of the LOOP block.

Also illustrated here is the variable substitution feature which allows any sequencer attribute to be substituted into the command line to be executed. In this case, the current loop count is passed to the "echo" command. Any state file variable, when contained within $[ . . . ] will be replace by its value.

```
<BLOCK BNAME="TOP">
  <LOOP BNAME="TEST" MAX_LOOPS="3">
    <SEND_CMD Q="STN"> python mysetup.py </SEND_CMD>
    <SEND_CMD Q="SUT"> mytest.exe </SEND_CMD>
    <ON_LOOP>
      <SEND_CMD Q="STN"> echo LOOPING: Loop count = $[LOOP_CNT] </SEND_CMD>
    </ON_LOOP>
  </LOOP>
</BLOCK>
```

9) Adding an ON FAIL and an ON_PASS Block

A process block may optionally have an ON_PASS in order to perform a set of actions when all of the other actions in the block are complete. Also, an ON_FAIL block may exist to handle exit actions in the event that a manufacturing error occurred while processing the block, and there are no retries remaining to execute.

```
<BLOCK BNAME="TOP">
  <BLOCK BNAME="TEST" MAX_RETRIES="1">
    <SEND_CMD Q="STN"> python mysetup.py </SEND_CMD>
    <SEND_CMD Q="SUT"> mytest.exe </SEND_CMD>
    <ON_RETRY>
      <SEND_CMD Q="SUT"> sutlog.exe RETRY TEST
      </SEND_CMD>
    </RETRY>
    <ON_PASS>
      <SEND_CMD Q="SUT"> sutlog.exe SSTOPOP TEST
      </SEND_CMD>
    </ON_PASS>
    <ON_FAIL>
      <SEND_CMD Q="SUT"> sutlog.exe SSTOPOP TEST
      </SEND_CMD>
      <SEND_CMD Q="SUT"> python panel.py FAILSCREEN
      </SEND_CMD>
    </ON_FAIL>
  </BLOCK>
</BLOCK>
```

10) Running a Block Based on a Previous RC
A block or command element may be selected to run based upon the RC of the previous command. The control attribute that is used to do this is the "RUN_IF_RC" attribute.
In this example, this attribute is used to determine whether to run the "do something" command depending upon whether the previous command returned a "1" or not for it's return code.

```
<BLOCK BNAME="TOP">
  <BLOCK BNAME="TEST">
    <SEND_CMD RC_TO_MERR="(*)PASS" Q="STN"> python
    mysetup.py </SEND_CMD>
    <SEND_CMD RUN_IF_RC="(1)"> do_something
    </SEND_CMD>
  </BLOCK>
</BLOCK>
```

11) Add a Block that Runs Conditionally Using "RUN_IF_STRINGVAR" Control Attribute
In this example, the command foo_test.py will run if there is a variable in the state file called "FOO" that has a value of either "BAR" or "ZOID".

```
<BLOCK BNAME="TOP">
  <BLOCK BNAME="TEST">
    <SEND_CMD RUN_IF_STRINGVAR="FOO (BAR,ZOID)"
    Q="SUT"> python foo_test.py </SEND_CMD>
  </BLOCK>
</BLOCK>
```

12) Simple Substitution of a Variable into a Command Line String
Normally, the sequencer simply passes the command string in the SEND_CMD element to a listener without modifying it in any way. However, state file variables may be substituted into the command string if the variable name is enclosed in special control characters as follows: $[varname]. The sequencer will look for the "varname" variable in the current block, and all ancestor nodes until it is found.
Modification as shown in this example allows the value of the SUT serial number be passed to the mysetup.py program.

```
<BLOCK BNAME="TOP>
  <BLOCK BNAME="TEST>
    <SEND_CMD Q="STN"> python mysetup.py --
    mtsndir=$[SERIAL] </SEND_CMD>
  </BLOCK>
</BLOCK>
```

During execution of a state file sequence, all run-time variables (program return codes and values, iteration counters, elapsed time calculations, etc.) are saved as XML attributes. The scope of these XML attributes is limited to the hierarchical level (branch) within which they exist. This allows processes to be created that can be run stand-alone, or repeated multiple times in a master state file to run concurrently without causing variable name conflicts. This would not be possible for systems that save the run-time data in variables with global scope, as is well appreciated by those skilled in the art.

With XML used as the semantics framework for the state file 201, available document definition languages, such as DTD or XML schema, may be used to enforce correct data entry. Data errors will thus be flagged prior to encountering the offending entries during a process run. Further, when the state file 201 uses industry standard XML, readily available tools for editing, displaying, parsing, and transforming the state file 201 may be used.

Thus, through the present invention, a hierarchical, block-structured process definition language is used to define a manufacturing process as a control file, providing an abstraction from the complexities of the underlying implementation. Also provided is a tool, the sequencer, that understands this language, "pushes" tasks to their specified destination, monitors tasks to ensure successful completion in the allotted time, and updates the control file as necessary with real-time control information. The sequencer architecture can understand an order that contains multiple shippable units to meet the particular needs of the manufacturing process. Further, a tool, the listener, runs on all applicable targets under all required operating systems. The listener, based on communication with the sequencer, starts tasks, monitors tasks, and sends results back to the sequencer utilizing a message protocol for communication. Thus, a hierarchical process definition language with run-time control capability is described for a single file that is a persistent structure that can be stopped and restarted at arbitrary points for representation and control of a unified manufacturing process.

Although the present invention has been described in accordance with the embodiments shown, one of ordinary skill in the art will readily recognize that there could be variations to the embodiments and those variations would be within the spirit and scope of the present invention. For example, although use of XML is described for a preferred embodiment, the principles and aspects of the present invention may be implemented in other program languages that can meet the needs and functions associated with the aspects of the present invention. Accordingly, many modifications may be made by one of ordinary skill in the art without departing from the spirit and scope of the appended claims.

What is claimed is:

1. A method for efficient order processing in a manufacturing environment, the method comprising:
utilizing a hierarchical definition language with run-time control capability in at least one server and a local control system coupled to a plurality of systems under test (SUTs) to represent and control a box line manufacturing process of computer systems in a unified manner.

2. The method of claim 1 wherein utilizing further comprises providing a state file, the state file including blocks, sub-blocks, tasks, and containers for run-time information.

3. The method of claim 2 further comprising providing a sequencer tool for interacting with the state file to direct tasks of the state file, monitor task completion, and update the state file with real-time control information.

4. The method of claim 3 further comprising providing a listener tool for interacting with the sequencer tool to start tasks, monitor tasks, and send task results to the sequencer tool.

5. The method of claim 4 further comprising defining a messaging protocol to support communication between the sequencer tool and the listener tool, the messaging protocol including unique identifiers and return codes for each task.

6. The method of claim 3 further comprising providing the sequencer tool on the local control station in the manufacturing environment.

7. The method of claim 6 further comprising providing the state file in an MTSN (machine-type-serial-number) directory of a local server coupled to the local control station.

8. The method of claim 6 further comprising providing the listener tool on at least the plurality of SUTs coupled to the local control station.

9. The method of claim 1 wherein utilizing further comprises providing a state file in XML.

10. A system for efficient order processing in a manufacturing environment, the system comprising:
   a plurality of systems under test (SUTs);
   at least one server networked to the plurality of SUTs; and
   a local control system coupled to the plurality of SUTs and networked to the at least one server, wherein the at least one server and the local control system utilize a hierarchical definition language with run-time control capability to represent and control a manufacturing process for the plurality of SUTs in a unified manner.

11. The system of claim 10 wherein the at least one server further comprises a first level server, the first level server providing a state file, the state file including blocks, sub-blocks, tasks, and containers for run-time information.

12. The system of claim 11 wherein the local control system further comprises a sequencer tool for interacting with the state file to direct tasks of the state file, monitor task completion, and update the state file with real-time control information.

13. The system of claim 12 wherein at least the plurality of SUTs each further comprise a listener tool for interacting with the sequencer tool to start tasks, monitor tasks, and send task results to the sequencer tool.

14. The system of claim 12 wherein the sequencer tool and listener tool communicate through a messaging protocol, the messaging protocol including unique identifiers and return codes for each task.

15. The system of claim 11 wherein the first level server provides the state file in an MTSN (machine-type-serial-number) directory.

16. The system of claim 11 wherein the first level server provides the state file in XML.

17. A computer readable medium containing program instructions for efficient order processing in a manufacturing environment, the program instructions comprising:
   providing a state file, the state file including blocks, sub-blocks, tasks, and containers for run-time information of a a box line manufacturing process of computer systems;
   providing a sequencer tool for interacting with the state file to direct tasks of the state file, monitor task completion, and update the state file with real-time control information; and
   providing a listener tool for interacting with the sequencer tool to start tasks, monitor tasks, and send task results to the sequencer tool.

18. The computer readable medium of claim 17 further comprising defining a messaging protocol to support communication between the sequencer tool and the listener tool, the messaging protocol including unique identifiers and return codes for each task.

19. The computer readable medium of claim 17 wherein providing a state file further comprises providing a state file in XML.

20. The computer readable medium of claim 17 wherein providing a state file further comprises providing the state file in an MTSN (machine-type-serial-number) directory.

* * * * *

UNITED STATES PATENT AND TRADEMARK OFFICE
CERTIFICATE OF CORRECTION

| | |
|---|---|
| PATENT NO. | : 7,054,700 B2 |
| APPLICATION NO. | : 10/716061 |
| DATED | : May 30, 2006 |
| INVENTOR(S) | : Blouin et al. |

It is certified that error appears in the above-identified patent and that said Letters Patent is hereby corrected as shown below:

Title Page

Item (75), Inventors, Barry A. Kritt's Address, delete "Raleigh" and replace with --Creedmoor--.

Column 1

Line 7, add --to-- after "related" and before "co-pending".

Line 7, delete --to-- after "co-pending" and before "U.S.".

Column 10

Line 11, add --in a local server,-- after "file" and before "the".

Line 13, delete --a-- after "a" and before "box".

Line 15, add --in a local control station-- after "tool" and before "for".

Line 19, add --in at least a plurality of SUTs-- after "tool" and before "for".

Signed and Sealed this

Fifteenth Day of August, 2006

JON W. DUDAS
*Director of the United States Patent and Trademark Office*